(12) United States Patent
Biondini et al.

(10) Patent No.: US 9,932,470 B2
(45) Date of Patent: Apr. 3, 2018

(54) HIGHLY FILLED SOFT POLYOLEFIN COMPOSITION FOR ROOFING MEMBRANE

(71) Applicant: BASELL POLIOLEFINE ITALIA S.R.L., Milan (IT)

(72) Inventors: Gisella Biondini, Ferrara (IT); Michele Grazzi, Ferrara (IT); Luca Lunghi, Ferrara (IT); Claudio Cavalieri, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 103 days.

(21) Appl. No.: 15/029,470

(22) PCT Filed: Oct. 1, 2014

(86) PCT No.: PCT/EP2014/071020
§ 371 (c)(1),
(2) Date: Apr. 14, 2016

(87) PCT Pub. No.: WO2015/055433
PCT Pub. Date: Apr. 23, 2015

(65) Prior Publication Data
US 2016/0257809 A1    Sep. 8, 2016

(30) Foreign Application Priority Data
Oct. 15, 2013    (EP) .................................... 13188697

(51) Int. Cl.
*C08L 23/00*    (2006.01)
*C08L 23/16*    (2006.01)
*E04B 1/94*    (2006.01)
*E04D 5/06*    (2006.01)
*H01B 3/44*    (2006.01)

(52) U.S. Cl.
CPC .............. *C08L 23/16* (2013.01); *E04B 1/942* (2013.01); *E04D 5/06* (2013.01); *H01B 3/441* (2013.01); *C08L 2201/02* (2013.01); *C08L 2205/025* (2013.01); *C08L 2205/03* (2013.01); *C08L 2207/02* (2013.01)

(58) Field of Classification Search
CPC .. C08L 23/16; C08L 2201/02; C08L 2205/03; C08L 2207/02; C08L 2205/025; H01B 3/441; E04D 5/06; E04B 1/942
USPC ........................................................ 524/528
See application file for complete search history.

(56) References Cited

U.S. PATENT DOCUMENTS

2012/0244338 A1    9/2012  Schultz et al.
2012/0264883 A1*  10/2012  Pellegatti ................ C08L 23/16
                                                                525/240

FOREIGN PATENT DOCUMENTS

| CN | 102639623 A | 8/2012 |
| EP | 633289 A1 | 1/1995 |
| EP | 2660287 A1 | 11/2013 |
| WO | WO-2011061087 A1 | 5/2011 |
| WO | WO-2012152803 A1 | 11/2012 |

OTHER PUBLICATIONS

PCT International Search Report and the Written Opinon—dated November 25, 2014 (Nov. 25, 2014) for Corresponding PCT/EP2014/071020.

* cited by examiner

*Primary Examiner* — Hui Chin

(57) ABSTRACT

The present disclosure relates to highly filled polyolefin compositions with improved balance of properties particularly for applications where puncture and tear resistance is requested comprising a flexible heterophasic polyolefin composition (I), consisting of a crystalline polymer fraction (A) consisting of a copolymer of propylene with ethylene having a fraction insoluble in xylene at 25° C. of at least 90% by weight, and an elastomeric fraction (B) consisting of a copolymer or blend of copolymers of ethylene with propylene; the copolymer or blend containing units derived from ethylene in a quantity lower than 40% by weight. The fraction soluble in xylene at 25° C. of the polyolefin composition having an $IV_{gpc}$ lower than 2.5 dl/g, a broad molecular weight distribution Mw/Mn (GPC) equal to or higher than 4, and a Mz/Mw (GPC) equal to or higher than 2.5.

8 Claims, No Drawings

HIGHLY FILLED SOFT POLYOLEFIN COMPOSITION FOR ROOFING MEMBRANE

This application is the U.S. National Phase of PCT International Application PCT/EP2014/071020, filed Oct. 1, 2014, claiming benefit of priority to European Patent Application No. 13188697.0, filed Oct. 15, 2013, the contents of which are incorporated herein by reference in its entirety.

FIELD OF THE INVENTION

The present disclosure relates to filled soft polyolefin compositions for highly filled items, sheets or film for roofing and geomembranes, particularly suited for synthetic flame retardant membranes for roofing used for roofing coverings, combining better processability, improved softness and good mechanical and welding properties. The compositions of the present disclosure are suitable for inner filling or liners for industrial cables or cable sheathing.

BACKGROUND OF THE INVENTION

Polyolefin compositions having elastic properties while maintaining a good thermoplastic behavior have been used in many application fields, due to the valuable properties which are typical of polyolefins, such as chemical inertia, mechanical properties and nontoxicity. Moreover, they can be transformed into finished products with the same techniques used for thermoplastic polymers. In particular, flexible polymer materials are widely used in the medical field, as well as for packaging, extrusion coating and electrical wires and cables covering. In many of these applications, vinyl chloride polymers containing adequate plasticizers, which are necessary to give polymers their desired flexibility characteristics, are presently used. The polymer products, however, are subject to ever increasing criticism both for the suspected toxicity of the plasticizers they contain and because when incinerated, they can disperse into the atmosphere extremely toxic by-products, such as dioxin. It would be very useful to substitute these materials with products which retain the desired flexibility characteristics and transparency as well as the chemical inertia and nontoxicity typical of olefin polymers. Elastic polypropylene compositions retaining good thermoplastic behavior have been obtained by way of sequential copolymerization of propylene, optionally containing minor quantities of olefin comonomers, with ethylene/propylene or ethylene/alpha-olefin copolymers mixtures. Catalysts based on halogenated titanium compounds supported on magnesium chloride are commonly used for this purpose.

For instance, EP-A-472 946 describes flexible elastoplastic polyolefin compositions comprising, in parts by weight: A) 10-50 parts of an isotactic propylene homopolymer or copolymer; B) 5-20 parts of an ethylene copolymer, insoluble in xylene at room temperature; and C) 40-80 parts of an ethylene/propylene copolymer containing less than 40% by weight of ethylene and being soluble in xylene at room temperature; where the intrinsic viscosity of said copolymer is from 1.7 to 3 dl/g. These compositions are relatively flexible and have good elastic properties, as demonstrated by flexural modulus values lower than 150 MPa, Shore D hardness from 20 to 35, and Shore A hardness of about 90, associated with good tension set values (of 20-50% at 75% elongation, and about 33-40% at 100% elongation). Nevertheless, such values are not satisfactory for many applications. Mineral fillers, such as aluminum and magnesium hydroxides or calcium carbonate, are commonly used at high concentration levels in polyolefin compositions for several reasons, for instance to impart self-extinguishing properties or to improve application-related physical properties, such as soft touch and printability. The major disadvantage of these mineral fillers, in particular when used on functional grounds as in the case of flame retardants, is the very high loading needed. Depending on the class of fire-retardancy requested, up to 65-70% by weight of filler can be necessary in order to reach adequate effectiveness in polyolefins: A lower amount of filler, around 40-60% wt, can be also sufficient for flame retardancy in certain applications. Normally, this has a highly negative influence on the processing of the polymer, with difficulties in adding and dispersing such high levels of filler, and on the physical-mechanical properties of compounds, namely lower elongation at break, lower tensile strength and higher brittleness.

EP 1 043 733 describes self-extinguishing electrical cables having a coating layer based on a polymer material containing a flame-retardant inorganic filler; this polymer material comprises a heterophasic copolymer having at least 45% by weight of an elastomeric phase based on ethylene copolymerized with an alpha-olefin, and a thermoplastic crystalline phase based on propylene. While these compositions incorporate large amounts of flame-retardant filler, the very high levels of filler negatively affect the physical-mechanical properties of the polymer material, and in particular lead to low elongation values. As a result, the final product is no longer useful in various applications, such as roofing, membranes and cables.

More flexible elastoplastic polyolefin compositions have been described in WIPO Pat. App. Pub. No. WO03/011962, and comprise, by weight:
A) 8 to 25% of a crystalline polymer fraction selected from propylene homopolymer and propylene copolymers with a C4-8 alpha-olefin;
B) 75 to 92% of an elastomeric fraction comprising two different propylene elastomeric copolymers, and more specifically: (1) a first elastomeric copolymer of propylene with 15 to 32% of ethylene and/or a C4-8 alpha-olefin, and (2) a second elastomeric copolymer of propylene with more than 32% up to 45% of ethylene and/or a C4-8 alpha-olefin, with the (1)/(2) weight ratio ranging from 1:5 to 5:1.
These polyolefin compositions have flexural moduli lower than 60 MPa, Shore A values lower than 90, and tensions set at 100% elongation of lower than 35%. The compositions described in this document do not contain relevant amounts of fillers.

In WIPO Pat. App. Pub. No. WO2004/026957 the flexible polyolefin compositions described in WIPO Pat. App. Pub. No. WO03/011962 are filled with 40 to 80% by weight of an inorganic filler, selected from flame-retardant inorganic fillers and inorganic oxides or salts, without losing their physical-mechanical properties, and in particular retaining low hardness and flexural modulus values, high elongation at break and low tension set values. The highly filled soft polyolefin compositions described in WIPO Pat. App. Pub. No. WO2004/026957 have Shore A hardness values lower than 90, elongation at break (ASTM D638) percentages higher than 400%, and tensile strength at break (ASTM D638) values equal to or higher than 4 MPa.

In WIPO Pat. App. Pub. No. WO2012/152803 polyolefin compositions of improved softness and ductility at low temperatures suitable for applications in membrane for roofing are disclosed, wherein a flexible heterophasic composition (I) with broad molecular weight distribution obtainable by blending heterophasic compositions of different melt flow indexes is further blended with an elastomeric component and highly filled with a flame retardant.

SUMMARY OF THE INVENTION

There is a need for polyolefin compositions that, when appropriately compounded with inorganic fillers, show an improved balance of properties in applications such as single ply roofing membranes, where softness, ductility and processability are maintained without excessive deterioration of other mechanical properties such as tensile properties and weldability. It is desirable for these compositions to also have high puncture and tear resistance in membranes for roofing coverings.

One object of the present technology is a filled polyolefin composition having a MFR (230° C./2.16 kg) of from 2 to 7 g/10 min, comprising a flexible heterophasic polyolefin composition (I), consisting of a crystalline polymer fraction (A) consisting of a copolymer of propylene with ethylene; the copolymer containing at least 85% by weight of units derived from propylene and the crystalline fraction having a fraction insoluble in xylene at 25° C. of at least 90% by weight, and an elastomeric fraction (B) consisting of a copolymer or blend of copolymers of ethylene with propylene; where the copolymer or blend containing units derived from ethylene are lower than 40% by weight.

In some embodiments, the fraction soluble in xylene at 25° C. of the polyolefin composition has an $IV_{gpc}$ lower than 2.5 dl/g, a broad molecular weight distribution Mw/Mn (GPC) equal to or higher than 4, and Mz/Mw (GPC) equal to or higher than 2.5.

The filled polyolefin composition may further comprise an inorganic filler (II) selected from flame-retardant inorganic fillers and inorganic oxides or salts; and The filled polyolefin composition may further comprise a butene-1 copolymer having: a flexural modulus (ISO 178) lower than 60 MPa, a Shore A (ISO 868) lower than 90 and a Tg (DMTA) lower than −20° C.

In further embodiments, the sum of a), b) and c) is 100%.

DETAILED DESCRIPTION OF THE INVENTION

In certain embodiments, the filled polyolefin composition object of the present disclosure may have a MFR (230° C./2.16 kg) of from 2 to 7 g/10 min, comprising:

a) 35 to 65% by weight of a flexible heterophasic polyolefin composition (I), comprising the following fractions (wherein the total of the A and B fractions is 100%):

A) from greater than 40 to 55% by weight, such as from 41 to 55% by weight, and from 45 to 50% by weight, of a crystalline polymer fraction consisting of a copolymer of propylene with ethylene; said copolymer containing at least 85% by weight of units derived from propylene, said crystalline fraction having a fraction insoluble in xylene at 25° C. of at least 90% by weight, having an intrinsic viscosity of the xylene insoluble fraction of from 1.2 to 1.9 dl/g, and having a MFR (230° C./2.16 kg) of from 50 to 80.

B) from 45 to less than 60% by weight, including from 45 to 59% by weight, and from 50 to 55% by weight of an elastomeric fraction consisting of a copolymer or blend of copolymers of ethylene with propylene; said copolymer or blend containing units derived from ethylene in a quantity lower than 40% by weight, such as from 20 to 30% by weight of units derived from ethylene, said elastomeric fraction preferably having solubility in xylene (XS) at room temperature (25° C.) greater than 50% by weight, and an intrinsic viscosity of the soluble fraction (XSIV) of equal to or less than 2.3 dl/g.

In further embodiments, the fraction soluble in xylene at 25° C. of the polyolefin composition has an $IV_{gpc}$ lower than 2.5 dl/g, such as from 1.5 to 2.2 dl/g; and a broad molecular weight distribution Mw/Mn (GPC) equal to or higher than 4, including from 6 to 10, Mz/Mw (GPC) equal to or higher than 2.5; and a MFR of the composition A+B at 230° C./2.16 kg of from 3 to 8 g/10 min, such as from 4 to 7 and from 5 to 6 g/10 min;

b) 30 to 80% by weight, including from 30 to 55% by weight, of an inorganic filler (II) selected from flame-retardant inorganic fillers and inorganic oxides or salts; and c) 2 to 25% by weight, such as from 5 to 15% by weight, of a butene-1 copolymer having flexural modulus (ISO 178) lower than 60 MPa, including lower than 20 MPa, a Shore A (ISO 868) lower than 90, such as lower than 80, and a Tg (DMTA) lower than −20° C., and a tension set at 100% elongation (ISO 2285) lower than 45%, including lower than 35%.

In some embodiments, the sum of a), b) and c) is 100%.

The highly filled polyolefin compositions of the present technology exhibit a Shore Hardness D lower than 50, such as lower than 45; an elongation at break (ISO 527-3 (technically equivalent to the ASTM D638 norm) higher than 250%, including higher than 500% and a tensile strength at break (ISO 527-3) equal to or higher than 10, such as higher than 15 MPa. The improved balance of flexibility, flowability and puncture and tear resistance is obtained by maintaining good weldability in the composition of the present disclosure.

The filled composition of the present disclosure is suitable in applications such as roofing, including single-ply roofing coverings where softness, elasticity and ductility are important, but also tear and puncture resistance and weldability of the material is essential in installation and service conditions, as the resulting membrane is often subjected to significant environmental stress.

The term "elastomeric" refers to a polymer having low crystallinity or an amorphous composition, such as having a solubility in xylene at room temperature (25° C.) greater than 50% by weight, including greater than 60% by weight. In some embodiments, the intrinsic viscosity of the soluble fraction η (in tetrahydronaphthalene at 135° C.) of the composition (I) according to the present disclosure is equal to or less than 2.3 dl/g, such as equal to or less than 2.1.

The broad molecular weight distribution measured on the fraction soluble in xylene at room temperature of the composition (I) (component a) may be obtained, in certain embodiments, ex-reactor.

The composition (I) according to the present disclosure may have a MFR (230° C./2.16 kg) of from 3 to 8 g/10 min, including from 3.5 to 6 g/10 min.

According to one embodiment of the present disclosure, the heterophasic polyolefin composition (I) (component a) may be obtained in the form of spheroidal particles having an average diameter of 250 to 7,000 microns, a flowability of less than 30 seconds and a bulk density (compacted) greater than 0.4 g/ml. The heterophasic polyolefin composition (I) may be prepared by polymerization in sequential polymerization stages, with each subsequent polymerization being conducted in the presence of the polymeric material formed in the immediately preceding polymerization reaction. The polymerization stages may be carried out in the presence of a Ziegler-Natta and/or a metallocene catalyst. According to some embodiments, all the polymerization stages are carried out in the presence of a catalyst comprising a trialkylaluminum compound, optionally an electron donor, a solid catalyst component comprising a halide or halogen-alcoholate of Ti and an electron donor compound supported on anhydrous magnesium chloride, with solid catalyst component having a surface area (measured by BET) in certain embodiments of less than 200 m$^2$/g, and a porosity (measured by BET) higher than 0.2 ml/g. Catalysts having the above mentioned characteristics are described in U.S. Pat. No. 4,399,054, EP-A-45 977 and U.S. Pat. No. 4,472,524. The polymerization process is described in details in the EP-A-472946, the content of which is incorporated herein by reference.

The polymerization stages may occur in liquid phase, in gas phase or liquid-gas phase. In some embodiments, the polymerization of the crystalline polymer fraction (A) is carried out in liquid monomer (e.g. using liquid propylene as a diluent), while the copolymerization stages of the elastomeric copolymer(s) in fraction (B) are carried out in gas phase, largely without intermediate stages except for the partial degassing of propylene. According to one embodiment, all of the sequential polymerization stages are carried out in gas phase. The reaction temperature in the polymerization stage for the preparation of the crystalline polymer fraction (A) and in the preparation of the elastomeric copolymer(s) in fraction (B) can be the same or different, and may be from 40° C. to 90° C. and from 50 to 80° C. in the preparation of fraction (A), and from 40 to 80° C. for the preparation of fractionh (B). The pressure of the polymerization stage required to prepare the fraction (A), if carried out in liquid monomer, is one which competes with the vapor pressure of the liquid propylene at the operating temperature used. It may be modified by the vapor pressure of a small quantity of inert diluent used to feed the catalyst mixture, by the overpressuring of optional monomers and by the use of hydrogen as a molecular weight regulator. The polymerization ranges, in certain embodiments, from 33 to 43 bar for liquid phase, and from 5 to 30 bar for gas phase. The residence times relative to the two stages depend on the desired ratio between fractions (A) and (B), and can range from 15 minutes to 8 hours. Conventional molecular weight regulators known in the art, such as chain transfer agents (e.g. hydrogen or ZnEt$_2$), may be used.

Alternatively, the composition (I) according to the present disclosure can be obtained by separate production of the components and subsequent blending, e.g. melt blending in conventional extrusion or mixing equipment.

The butene-1 copolymer (component c) according to the disclosure may be a butene-1 copolymer having one or more of the following properties:
a content of butene-1 derived units of 80 wt % or more, such as 84 wt % or more;
a flexural elastic modulus of 40 MPa or less, including 30 MPa or less; and a melting temperature DSC (TmI) lower than 110° C., such as equal to or lower than 50° C.
The butene-1 copolymer (component c) can be prepared in presence of a metallocene catalyst according to WIPO Pat. App. Pub. No. WO2009/000637, herein incorporated by reference.

The butene-1 copolymer component (component c) may comprise a 1-butene/ethylene copolymer having a content of copolymerized ethylene of from 5% by mol to 18.00% by mol, including from 15.50% by mol to 17% by mol; and may comprise one or more of the following properties:
  a) a molecular weight distribution Mw/Mn lower than 3;
  b) a shore A hardness (measured according to ISO 868) lower than 65; including lower than 60;
  c) a tension lower than 30% at 100% deformation (according to ISO 2285) of lower than 20%;
  d) no melting point detectable via differential scanning calorimetry (DSC), measured by cancelling the thermal history of the copolymer according to the methods described in this document;
  e) a melting enthalpy, measured after 10 days of aging at room temperature and measured according to the methods described in this document, between 4 and 15 J/g; such as between 5 and 10 J/g; and
  f) a content of 1-butene units in form of isotactic pentads (mmmm) higher than 90%; such as higher than 98%.

The butene-1 copolymer (component c) can further comprise:
  i) 80 wt % or more, such as from 85 to 95 wt % and 93-90 wt %, of butene-1 copolymer, and
  ii) up to 20 wt %, including from 5 to 15 wt % and from 7 to 10 wt %, of a crystalline propylene polymer; provided that the total content of copolymerized ethylene and propylene is equal to or less than 16 wt % of the composition (i)+(ii).

The crystalline propylene polymer (ii) is, in certain embodiments, a propylene copolymer, such as a propylene terpolymer and a copolymer of propylene with ethylene and a C$_4$-C$_8$ alpha-olefin or blends thereof. The overall processability of the butene-1 copolymer component (c) may be improved, in some embodiments, by in-line compounding up to 20 wt % of the crystalline propylene polymer component (ii) without substantial deterioration of other mechanical properties. The crystalline propylene polymer (ii) has, in certain embodiments, a melt flow rate (MFR) at 230° C., 2.16 kg of from 0.6 to 10 g/10 min, such as from 2 to 10 g/10 min, and a melting temperature DSC of from 130° C. to 160° C.

In some embodiments, the total content of ethylene in the crystalline propylene polymer (ii) is from 1% to 5% by weight and the total content of C4-C8 alpha-olefin in the component (ii) is 2.4% to 12% by weight.

The highly filled soft polyolefin composition according to the present disclosure further comprises inorganic filler (II) (component b), selected from flame-retardant inorganic fillers and inorganic oxides or salts.

In applications where self-extinguishing properties are required, component (b) may comprise flame-retardant inorganic fillers such as hydroxides, hydrated oxides, salts or hydrated salts of metals, including Ca, Al or Mg, such as, for example: magnesium hydroxide Mg(OH)$_2$, aluminum hydroxide Al(OH)$_3$, alumina trihydrate Al$_2$O$_3$.3H$_2$O, magnesium carbonate hydrate, magnesium carbonate MgCO$_3$, magnesium calcium carbonate hydrate, magnesium calcium carbonate, or mixtures thereof. The metal hydroxides, such as magnesium and aluminum hydroxides, may be used in the form of particles with sizes between 0.1 and 100 µm, including between 0.5 and 10 µm. In certain embodiments, the inorganic filler is precipitated magnesium hydroxide having a specific surface area of from 1 to 20 m$^2$/g, such as from 3 to 10 m$^2$/g, and an average particle diameter ranging from 0.5 to 15 µm, including from 0.6 to 1 µm. The precipitated magnesium hydroxide generally contains very low amounts of impurities in the form of salts, oxides and/or hydroxides of other metals, such as Fe, Mn, Ca, Si, V, etc. The amount and nature of such impurities depend on the origin of the starting material. The degree of purity is generally between 90 and 99% by weight. The filler can be used in the form of coated particles. Coating materials for use in certain embodiments of the present technology include saturated or unsaturated fatty acids containing from 8 to 24 carbon atoms, and metal salts thereof, such as oleic acid, palmitic acid, stearic acid, isostearic acid, lauric acid, and magnesium or zinc stearate or oleate. Inorganic oxides or salts may be selected from CaO, $TiO_2$, $Sb_2O_3$, ZnO, $Fe_2O_3$, $CaCO_3$, $BaSO_4$ and mixtures thereof.

The highly filled soft polyolefin compositions according to the present disclosure can be prepared by mixing the polymer components, the filler and optionally further additives according to methods known in the art. For instance, the components may be mixed in an internal mixer having tangential rotors (such as Banbury mixers) or having interpenetrating rotors, or alternatively in continuous mixers (such as Buss mixers) or corotating or counter-rotating twin-screw mixers.

The polymeric component of the present technology is beneficially capable of incorporating large amounts of fillers, while at the same time retaining the physical and mechanical properties of unfilled and less flexible compositions. In some embodiments, the highly filled polyolefin compositions of the technology are endowed with a flexural modulus (ISO 178 on compression molded samples 1 mm thick) of from 300 to 800 MPa, including higher than 500 MPa. Thus, with the addition of component (c) in combination with component (a) in accordance with certain embodiments a valuable balance of properties is obtained. An increase in puncture and tear resistance may be obtained even at relatively high stiffness (flexural modulus).

The filled polyolefin compositions of the present disclosure find application, in some embodiments, as a plasticized PVC replacement. In fields where self-extinguishing properties are required, the compositions of the disclosure may be used in lieu of plasticized PVC, in applications such as reinforced and nonreinforced roofing membranes, inner filling for industrial cables, cable sheathing and adhesive tapes.

Therefore, the present disclosure is, in further embodiments, directed to an article comprising the above described filled polyolefin composition. In further embodiments, it is also directed to blown or cast films or sheets suitable for application in the field of roofing and geomembranes.

Conventional additives known in the art may be added to the highly filled soft polyolefin compositions of the present disclosure. For instance, in order to enhance the compatibility between the inorganic filler and the heterophasic polymer composition, coupling agents may be used; the coupling agents may be saturated silane compounds or silane compounds containing at least one ethylenic unsaturation site, epoxides containing an ethylenic unsaturation site, organic titanates, mono- or dicarboxylic acids containing at least one ethylenic unsaturation site, or derivatives thereof such as anhydrides or esters.

Mono- or dicarboxylic acids containing at least one ethylenic unsaturation site, or derivatives thereof, which can be used as coupling agents in the present technology include maleic acid, maleic anhydride, fumaric acid, citraconic acid, itaconic acid, acrylic acid, methacrylic acid and the like, and the anhydrides or esters derived therefrom, or mixtures thereof.

The coupling agents can be used as commercially available or pre-grafted onto a polyolefin, for example polyethylene or copolymers of ethylene with an alpha-olefin, by means of a radical reaction (as described in EP-A-530 940). The amount of grafted coupling agent may comprise between 0.05 and 5 parts by weight, such as from 0.1 to 2 parts by weight, relative to 100 parts by weight of polyolefin. Polyolefins grafted with maleic anhydride are commonly available as commercial products, such as Polybond 3200, produced by Chemtura, or Qestron by LyondellBasell Industries.

Alternatively, the coupling agents of carboxylic or epoxy type mentioned above (for example maleic anhydride) or silanes containing an ethylenic unsaturation site (for example vinyltrimethoxysilane) can be added to the mixture in combination with a radical initiator so as to graft the compatibilizing agent directly onto the polymer material. Initiators which can be used are organic peroxides, such as tert-butyl perbenzoate, dicumyl peroxide, benzoyl peroxide, di-tert-butyl peroxide and the like. This technique is described, for example, in U.S. Pat. No. 4,317,765.

The amount of coupling agent that may be added to the mixture may vary according to the nature of the coupling agent used and the amount of flame-retardant filler added, and, in some embodiments, ranges from 0.01 to 10%, including from 0.1 to 5%, and from 1 to 3% by weight with respect to the total weight of the highly filled polyolefin composition. Conventional additives such as processing aids, lubricants, nucleating agents, extension oils, organic and inorganic pigments, anti-oxidants and UV-protectors, and related additive commonly used in olefin polymers, may also be added.

Processing aids usually added to the polymer material are, for example, calcium stearate, zinc stearate, stearic acid, paraffin wax, synthetic oil and silicone rubbers. Examples of antioxidants for use in the present technology are polymerized trimethyldihydroquinoline, 4,4'thiobis(3-methyl-6-tert-butyl)phenol; pentaerythrityltetrakis[3-(3,5-di-tert-butyl-4-hydroxyphenyl)propionate] and 2,2'-thiodiethylenebis[3-(3, 5-di-tertbutyl-4-hydroxyphenyl) propionate]. Other fillers which can be used are, for example, glass particles, glass fibers, calcinated kaolin and talc.

The following illustrate non-limiting embodiments in the present application.

EXAMPLES

The following examples are given for illustrating but not limiting purposes.

The following analytical methods are used to determine the properties reported in the description and in the examples.

Melt Flow Rate—

MFR is measured according to (ISO1133, at 230° C., 2.16 kg), where not otherwise specified.

MWD and IV Determination Via GPC—

The molecular weight distribution and related parameters Mn, Mw and Mz and $IV_{gpc}$ values were measured by way of gel permeation chromatography (GPC) at 150° C. using an Alliance GPCV 2000 instrument (Waters) equipped with four mixed-bed columns (PLgel Olexis, Agilent) having a particle size of 13 μm. The dimensions of the columns are 300×7.8 mm. The mobile phase used is vacuum distilled 1,2,4-Trichlorobenzene (TCB) and the flow rate is kept at 1.0 ml/min. The sample solution is prepared by heating the sample under stirring at 150° C. in TCB for about two hours. The concentration is 1 mg/ml. To prevent degradation, 0.1 g/l of 2,6-diterbutyl-p-cresol are added. 308.5 μL of solution are injected into the column set. A calibration curve is obtained using 10 polystyrene standard samples (EasiCal kit by Polymer Laboratories) with molecular weights in the range from 580 to 7500000. It is assumed that the K values of the Mark-Houwink relationship are:

K=1.21×10⁻⁴ dL/g and α=0.706 for the polystyrene standards;
K=2.46×10⁻⁴ dL/g and α=0.725 for the propylene copolymer samples.
A third order polynomial fit is used for interpolating the experimental data and obtaining the calibration curve. Data acquisition and processing is done by using Empower 1.0 with a GPCV option by Waters.

For butene-1 polymers the Mark-Houwink relationship was used to determine the molecular weight distribution and the relevant average molecular weights: the K values were KPS=1.21×10⁻⁴ dL/g and KPB=1.78×10⁻⁴ dL/g for PS and PB respectively, while the Mark-Houwink exponents α=0.706 for PS and α=0.725 for PB were used.

For butene/ethylene copolymers, as far as the data evaluation is concerned, it was assumed for each sample that the composition was constant in the whole range of molecular weight and the K value of the Mark-Houwink relationship was calculated using a linear combination as reported below:

$$K_{EB}=x_E K_{PE}+x_P K_{PB}$$

where $K_{EB}$ is the constant of the copolymer, $K_{PE}$ (4.06×10⁻⁴, dL/g) and $K_{PB}$ (1.78×10⁻⁴ dL/g) are the constants of polyethylene and polybutene, $x_E$ and $x_B$ are the ethylene and the butene wt % content. The Mark-Houwink exponents α=0.725 was used for all the butene/ethylene copolymers independently based on their composition.

For butene/propene copolymers, since PP and PB have very similar K, no corrections were applied and the copolymer was integrated using the K and α values of PB.

Tensile properties: Tensile modulus (Young's), strength and elongation at yield, strength and elongation at break, have been measured according to ISO 527-1-3.

Tensile Elastic Modulus (MET-DMTA) Tensile Elastic Modulus (storage modulus) was determined at 23° C. via DMA analysis according to the ISO 6721-4 on 1 mm thick compression molded plaque.

Flexural Elastic Modulus (MEF)—measured according to ISO 178.

Specimens for tensile modulus and flexural modulus test were cut from compression molded plaques pressed at 200° C. and aged via autoclave at room temperature for 10' at 2 kbar. The specimen thickness was 4 mm. The tensile strength and elongation at yield and at break were measured (stress and strain) following the ISO 527-3 (item 5A, 500 mm/min) measurements, on samples obtained from 1 mm sheets extruded on a Brabender 30 mm, 25 L/D single screw extruder with 1 mm thick flat die, and cut and tested in machine direction. (MD); Tensile Elastic Modulus was also measure on such samples.

Shore A (Sh. A) and Shore D (Sh. D) Hardness—measured on a compression molded plaques (thickness of 4 mm) following the ISO 868 measurement.

Tear resistance—measured according to ASTM D 1004.
Puncture resistance—measured according to ASTM D 4833.
Comonomer content (% wt)—measured using IR spectroscopy.
Intrinsic Viscosity—Determined in tetrahydronaphthalene at 135° C.
Xylene soluble and insoluble fractions (% wt): determined as follows:

2.5 g of polymer composition and 250 cm³ of o-xylene are introduced in a glass flask equipped with a refrigerator and a magnetic stirrer. The temperature is raised in 30 minutes up to the boiling point of the solvent. The resulting clear solution is then kept under reflux and stirring for an additional 30 minutes. The closed flask is then cooled to 100° C. in air for 10 to 15 minutes under stirring and then kept for 30 minutes in a thermostatic water bath at 25° C. for 30 minutes. The resulting solid is filtered on quick filtering paper. 100 cm³ of the filtered liquid is poured in a previously weighed aluminum container which is heated on a heating plate under nitrogen flow, to remove the solvent by evaporation. The container is then kept in an oven at 80° C. under vacuum until a constant weight is obtained. The weight percentage of polymer soluble in xylene (XS) at room temperature (25° C.) is then calculated.

The thermal properties (melting temperatures and enthalpies) of the butene-1 polymers were determined by Differential Scanning calorimetry (D.S.C.) on a Perkin Elmer DSC-7 instrument. The melting temperatures of 1-butene homo- and co-polymers were determined according to the following method:

TmII (measured in second heating run): a weighted sample (5-10 mg) obtained from the polymerization was sealed into an aluminum pan and heated at 200° C. with a scanning speed corresponding to 20° C./minute. The sample was kept at 200° C. for 5 minutes to allow for complete melting of all the crystallites thus cancelling the thermal history of the sample. Successively, after cooling to −20° C., with a scanning speed corresponding to 10° C./minute, the peak temperature was taken as the crystallization temperature (Tc). After standing 5 minutes at −20° C., the sample was heated for the second time at 200° C. with a scanning speed corresponding to 10° C./min. In this second heating run, the peak temperature was taken as the melting temperature of the poly 1-butene (PB) crystalline form II (TmII) and the area as the global melting enthalpy (ΔHfII).

Tm I The melting enthalpy after 10 days and the melting temperature of crystalline form I was measured as follows using Differential Scanning calorimetry (D.S.C.) on an Perkin Elmer DSC-7 instrument: a weighted sample (5-10 mg) obtained from the polymerization was sealed into an aluminum pan and heated at 200° C. with a scanning speed corresponding to 20° C./minute. The sample was kept at 200° C. for 5 minutes to allow for complete melting of all the crystallites. The sample was then stored for 10 days at room temperature. After 10 days the sample was subjected to DSC, it was cooled to −20° C., and then it was heated at 200° C. with a scanning speed corresponding to 10° C./min. In this heating run, the first peak temperature coming from the lower temperature side in the thermogram was taken as the melting temperature (TmI), and the area as the global melting enthalpy after 10 days (ΔH$_f$). Sometimes at least partially convoluted TmI and TmII temperatures peaks can be identified with this procedure. (ΔH$_f$) is measured as the total entalpy of the overall, at least partially convoluted, peak.

When propylene crystallinity is present, resulting from the addition of a polypropylene crystalline polymer to the butene-1 polymer (component b), a further melting temperature peak (PP) can be detected at higher temperatures.

DMTA Analysis

Molded specimens of 76 mm by 13 mm by 1 mm are fixed to the DMTA machine for tensile stress measurements. The frequency of the tension is fixed at 1 Hz. The DMTA produces the elastic response of the specimen between −100° C. to 130° C. for measuring the elastic response versus temperature. The elastic modulus for a viscoelastic material is defined as E=E'+iE". The DMTA can split the two components E' and E" by their resonance and plot E' vs temperature and E'/E"=tan (δ) vs temperature.

The glass transition temperature Tg is assumed to be the temperature at the maximum of the curve E'/E''=tan (δ) vs temperature.

The following materials are used in the Examples:

HPO1: Heterophasic polyolefin composition having MFR of 6 g/10 min, MEF of 220 MPa, Shore D Hardness (Sh.D) of 41, total Xylene Soluble fraction of 50.5% wt and Intrinsic Viscosity of the solubles (XSIV) of 2.15 dl/g, Mw/Mn of 8.4, Mz/Mw of 3.5, and IVgpc of 1.71 dl/g. HPO1 comprises the following fractions/components:

46.5% wt. of a crystalline copolymer of propylene (A) with 3.5% wt. of units derived from ethylene, having an MFR of 75 g/10 min, a soluble fraction in xylene at 25° C. of 6% wt., and 53.5% wt. of an elastomeric fraction of propylene with ethylene (B) having 25% by weight of units derived from ethylene and 89% wt of a fraction soluble in xylene at 25° C.

HPO2: (comparative modifier, soft heterophasic propylene composition) Heterophasic polyolefin composition comprising 15% wt. of a crystalline copolymer of propylene with 3.3% wt, and 85% wt. of elastomeric fraction of propylene with ethylene, prepared as in Example 3 of WIPO Pat. App. Pub. No. WO03/011962. The elastoplastic polymer was visbroken with peroxide (100 ppm Luperox 101) in a twin screw Berstoff extruder to a final melt index MFR (230° C./2.16 kg) of 2.8 g/10 min and intrinsic viscosity of the fraction soluble in xylene of 2 dl/g. Before visbreaking, the polymer of Example 3 showed a MFR of 0.07 g/10 min and an intrinsic viscosity of the fraction soluble in xylene of 4.57 dl/g. The HPO2 flexural modulus (ISO 178) is 35 MPa, Shore A (ISO 868) is 75, and Tg (DMTA) is −23° C.

PB1: a butene-1/ethylene copolymer produced according to the process described in WIPO Pat. App. Pub. No. WO2009/000637, at Example 4.

PB2: obtained from PB1 by in-line compounding a crystalline terpolymer (ii) added in an amount of 7% wt with respect to the weight of the copolymer composition (A)= (i)+(ii)=PB1+(ii). PB2 (component c) has a content ethylene copolymerized of 8.5% wt, a melt index MFR (190° C./2.16 kg) of 1 dl/g. The flexural modulus MEF (ISO 178) is 12 MPa, Shore A (ISO 868) is 64.5, $T_g$ (DMTA) is −27° C. and tension set at 100% elongation (ISO 2285) is 18%. DSC temperatures were TmII: non detectable; and TmI: 40.3° C. for the polybutene component.

MDH—$Mg(OH)_2$: Kisuma 5A-C by Kyowa Chemical Industry, precipitated magnesium hydroxide coated with fatty acid for compatibilization with polyolefins, having an average particle size of 0.94 μm, and a purity of 97.65%.

Table 1 and Table 2 report component amounts (% by weight) and properties of the compositions according to the present technology and comparative examples.

TABLE 1

|  |  | Example 1 | Example 2 | Comparative Example 3 |
|---|---|---|---|---|
| Component Amounts | Wt % | a) 58.5% HPO1<br>c) 6.5% PB2<br>b) 35% MDH | a) 52% HPO1<br>c) 13% PB2<br>b) 35% MDH | a) 52% HPO2<br>c) 13% PB2<br>b) 35% MDH |
| MFR | gr/10' | — | 4.3 | 3.9 | 3.5 |
| Shore D | NR | 39 | 37 | 40 |
| MEF (on 4 mm plaque) | MPa |  |  |  |
| MET (on 4 mm plaque) | MPa | — | 274 | 220 | 326 |
| Mechanical properties on 1 mm on Filled sheet Item 35% MDH ||||||
| MET (MD) | MPa |  |  |  |
| Tens. Stress at yield (MD) | MPa | 9.5 | 8.3 | 7.7 |
| Tens. Elong. at yield (MD) | % | 29 | 38.4 | 19 |
| Tens. Stress. at break (MD) | MPa | 20.2 | 19.7 | 14 |
| Elongation at break (MD) | % | 620 | 645 | 822 |
| Tear Resistance (MD) | N | 73.1 | 61.9 | 65 |
| Puncture Resistance | N | 202 | 224 | 172 |

TABLE 2

|  |  | Example 4 | Example 5 | Comparative Example 7 |
|---|---|---|---|---|
| Component Amounts |  | a) 45% HPO1<br>c) 5% PB2<br>b) 50% MDH | a) 40% HPO1<br>c) 10% PB2<br>b) 50% MDH | a) 40% HPO2<br>c) 10% PB2<br>b) 50% MDH |
| MFR | g/10' | 5.0 | 4.9 | 4.0 |
| Shore D | NR | 42 | 40 | 42 |
| MEF (on 4 mm plaque) | MPa |  |  |  |
| MET (on 4 mm plaque) | MPa | — | 200 | 205 | 330 |
| Mechanical properties on 1 mm on Filled sheet Item 50% MDH ||||||
| MET (MD) | MPa |  |  |  |
| Tens. Stress at yield (MD) | MPa | 9.7 | 8.3 | 10.2 |
| Tens. Elong. at yield (MD) | % | 19.2 | 27 | 13.1 |
| Tens. Stress. at break (MD) | MPa | 16.9 | 15.7 | 13.5 |
| Elongation at break (MD) | % | 605 | 580 | 760 |
| Tear Resistance (MD) | N | 65.1 | 45.5 | 47.9 |
| Puncture Resistance | N | 191.4 | 194.5 | 149.8 |

The selection of soft modifier c) in combination with the specified component a) according to the present technology provides considerable improvement of tear and puncture resistance of the filled composition, even at lower amount of modification, with respect to other soft modifiers available in the art (HPO2).

What is claimed is:

1. A filled polyolefin composition comprising:
   a) 35 to 65% by weight of a flexible heterophasic polyolefin composition (I), comprising the following fractions:
      A) from greater than 40 to 55% by weight of a crystalline polymer fraction consisting of a copolymer of propylene with ethylene; the copolymer containing at least 85% by weight of units derived from propylene, and the crystalline fraction having a fraction insoluble in xylene at 25° C. of at least 90% by weight;
      B) from 45 to less than 60% by weight of an elastomeric fraction consisting of a copolymer or blend of copolymers of ethylene with propylene; the copolymer or blend containing units derived from ethylene in a quantity lower than 40% by weight; and
      the fraction soluble in xylene at 25° C. of the polyolefin composition (I) having an IVgpc lower than 2.5 dl/g, a broad molecular weight distribution Mw/Mn (GPC) equal to or higher than 4, and a Mz/Mw (GPC) equal to or higher than 2.5;
   b) 30 to 55% by weight of an inorganic filler (II) selected from flame-retardant inorganic fillers and inorganic oxides or salts; and
   c) 2 to 25% by weight of a butene-1 copolymer having a flexural modulus (ISO 178) lower than 60 MPa, a Shore A (ISO 868) lower than 90 and a Tg (DMTA) lower than −20° C.;
   wherein the sum of a), b) and c) is 100% by weight, and the composition has an MFR (ISO 1133; 230° C., 2.16 kg) of 2-7 g/10 min.

2. The filled polyolefin composition of claim 1, wherein the elastomeric fraction B of component (a) has a solubility in xylene at room temperature of greater than 50% by weight.

3. The filled polyolefin composition of claim 1, wherein the inorganic filler (II) is a flame-retardant inorganic filler selected from hydroxides, hydrated oxides, salts and hydrated salts of metals.

4. The filled polyolefin composition of claim 1, wherein component c) is a butene-1 copolymer having:
   a content of butene-1 derived units of 80% by weight or more; and
   a melting temperature DSC (TmI) lower than 110° C.

5. The filled polyolefin composition of claim 1, having a Shore D hardness lower than 50, an elongation at break higher than 250%, and tensile strength at break equal to or higher than 10 MPa.

6. An article comprising the polyolefin composition of claim 1.

7. A sheet or film for roofing comprising the polyolefin composition of claim 1.

8. An inner filling for industrial cables or cable sheathing comprising polyolefin composition of claim 1.

* * * * *

UNITED STATES PATENT AND TRADEMARK OFFICE
CERTIFICATE OF CORRECTION

PATENT NO. : 9,932,470 B2
APPLICATION NO. : 15/029470
DATED : April 3, 2018
INVENTOR(S) : Biondini et al.

Page 1 of 1

It is certified that error appears in the above-identified patent and that said Letters Patent is hereby corrected as shown below:

On the Title Page

Column 2, item (56), under 'OTHER PUBLICATIONS', Line 1, delete "Opinon" and insert -- Opinion --.

In the Specification

In Column 4, Line 25, after "(ISO 527-3" insert -- ) --.
In Column 5, Line 29, delete "fractionh" and insert -- fraction --.
In Column 8, Line 48, delete "(IS01133," and insert -- (ISO1133, --.

Signed and Sealed this
First Day of February, 2022

Drew Hirshfeld
*Performing the Functions and Duties of the*
*Under Secretary of Commerce for Intellectual Property and*
*Director of the United States Patent and Trademark Office*